US011625503B2

(12) United States Patent
Burgupalli et al.

(10) Patent No.: US 11,625,503 B2
(45) Date of Patent: Apr. 11, 2023

(54) DATA INTEGRITY PROCEDURE

(71) Applicant: salesforce.com, inc., San Francisco, CA (US)

(72) Inventors: Mukesh Burgupalli, Mountain View, CA (US); Ravindarreddy Ankireddy, Panuballi Mandal (IN); Anthony Frank Zucaro, III, Sterling, VA (US); Abhishek Chaturvedi, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 151 days.

(21) Appl. No.: 16/918,478

(22) Filed: Jul. 1, 2020

(65) Prior Publication Data

US 2022/0004664 A1  Jan. 6, 2022

(51) Int. Cl.
*G06F 16/21* (2019.01)
*G06F 21/64* (2013.01)
*G06F 21/62* (2013.01)

(52) U.S. Cl.
CPC .......... *G06F 21/64* (2013.01); *G06F 21/6218* (2013.01)

(58) Field of Classification Search
CPC ............. G06F 16/2255; G06F 16/2456; G06F 16/2282; G06F 16/2455; G06F 16/221; G06F 16/9014; G06F 16/244; G06F 16/215; G06F 16/24532; G06F 16/2308; G06F 16/2365; G06F 21/64; G06F 21/6218
See application file for complete search history.

(56) References Cited

U.S. PATENT DOCUMENTS

| | | | |
|---|---|---|---|
| 7,949,640 B2 | 5/2011 | Holenstein et al. | |
| 8,074,103 B2 | 12/2011 | Dilman et al. | |
| 9,026,502 B2 | 5/2015 | Driesen et al. | |
| 9,996,562 B2 | 6/2018 | Higginson et al. | |
| 11,036,677 B1 * | 6/2021 | Grunwald | G06F 3/067 |
| 2019/0311057 A1 * | 10/2019 | Sung | G06F 16/24552 |
| 2020/0052901 A1 * | 2/2020 | Wicaksono | H04L 67/1095 |

* cited by examiner

*Primary Examiner* — Cindy Nguyen
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to ensuring data integrity between database objects. A computer system may receive a data integrity request for a first set of database tables. The computer system may generate at least two work items that correspond to respective data cell groups in the first set of database tables. The computer system may then cause a plurality of processes to perform the at least two work items to generate a first plurality of hash values that includes hash values for the respective data cell groups. The first plurality of hash values may be usable to compare with corresponding ones of a second plurality of hash values generated based on corresponding data cell groups in a second set of database tables replicated from the first set of database tables.

18 Claims, 7 Drawing Sheets

DATA INTEGRITY PROCEDURE

BACKGROUND

Technical Field

This disclosure relates generally to database systems and, more specifically, to ensuring data integrity between database objects.

Description of the Related Art

Companies routinely implement modern database systems that store information in an organized manner that can be accessed and manipulated. These database systems often include a collection of programs that together implement a database management system that interacts with a database that stores information. Such information is commonly represented in the form of tables that are composed of columns and rows in which each column defines a grouping of the information. During the operation of a database, information can be sent from that database to another database that serves as backup database in many cases.

Figure 1:
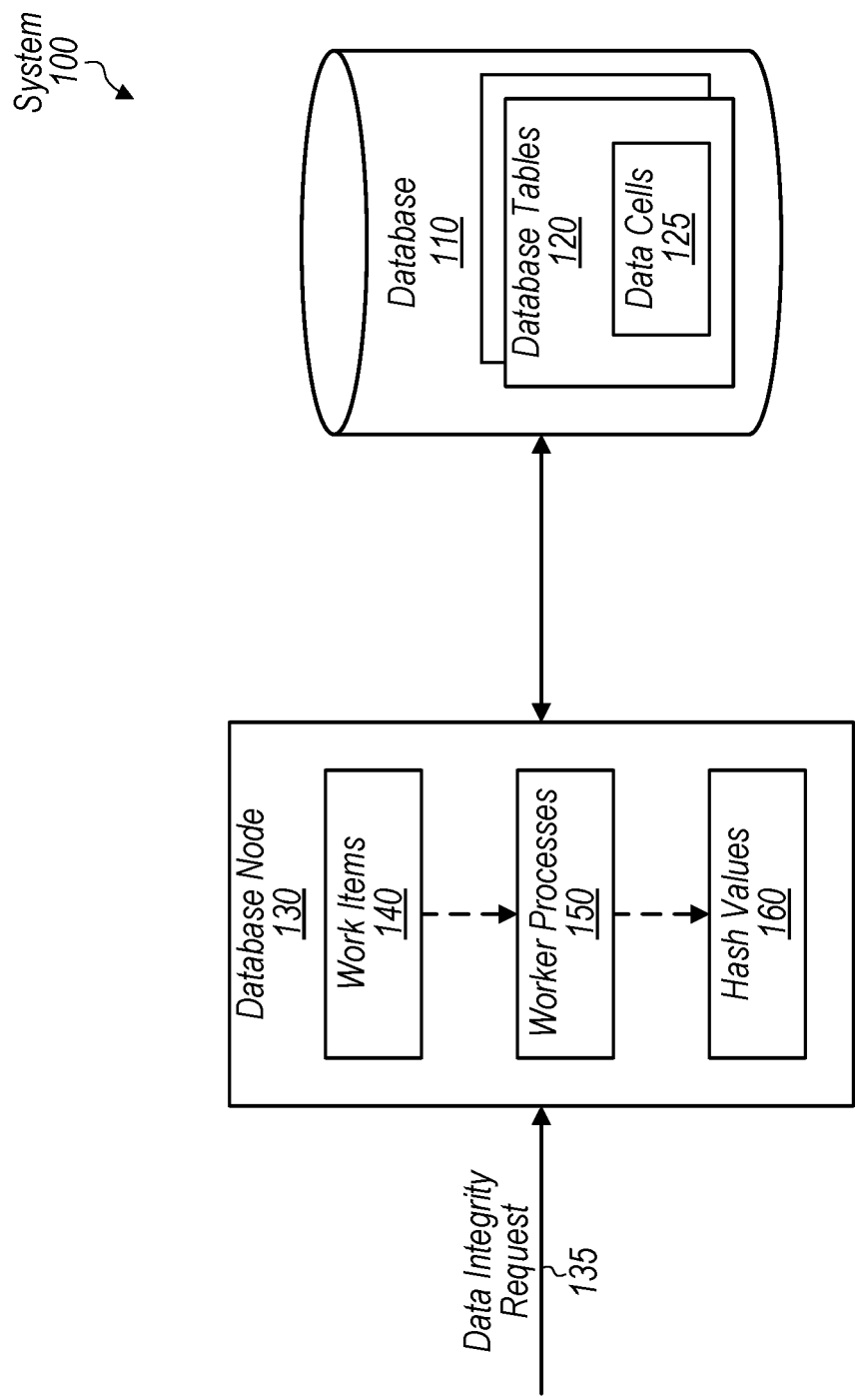
FIG. 1 is a block diagram illustrating example elements of a system that is capable of performing a data integrity procedure, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as operable to perform operations refers to both a software and a hardware module.

DETAILED DESCRIPTION

In many cases, information that is stored at a database is recreated at one or more other databases. For example, a company may implement a set of backup databases that store a copy of a portion or all of the information that is stored at a primary database. As another example, the information stored at a particular database might be split and copied into multiple databases in the event that the current amount of information reaches a threshold storage capacity of the particular database. It is usually desirable to ensure that information that is recreated at another database is consistent with the original information.

One approach for recreating information at another database is a block-level approach in which individual data blocks on disk are copied from the source database to the destination database—i.e., bytes of data are copied to create an exact copy. Accordingly, in order to ensure data integrity, the bytes of corresponding data blocks at the two databases can be compared to determine whether they match. Another upcoming approach for recreating information is an approach in which the database operations performed at the source database are replayed at the destination database—e.g., if an "INSERT" operation is performed at the source database, then that same INSERT operation is performed at the destination database. The same information is recreated at the destination database as the source database, but the underlying data blocks can be different. That is, the former approach performs a copy at the byte level while the latter approach performs a copy at a higher level of abstraction (at a logical level) and thus while the information that is recreated in both approaches is the same (e.g., the database tables include the same values for the same attributes), the underlying byte layout can be different. As a result, the data integrity approach of comparing data blocks (a byte-per-byte comparison) in order to ensure data integrity is not viable in the latter approach. The present disclosure addresses at least this technical problem of ensuring the integrity of data recreated under that latter approach of re-performing, at a destination database, database operations that are performed at a source database.

The present disclosure describes techniques for implementing a hashing scheme that is usable to ensure the integrity of data that has been recreated. This disclosure further describes techniques for providing concurrency support for the hashing scheme. In various embodiments that are described below, a computer system implements a data integrity procedure to generate hash values for database objects stored in a database. In some cases, a database object may be a database table comprising columns and rows whose intersections define data cells capable of storing data values. These data cells may be associated with respective hash values calculated based on the data values stored in those data cells. In various embodiments, the hash value for a database table is generated by first summing the hash values of the data cells of each column of the table to form column hash values. Those column hash values are then summed to form a table hash value that is representative of that table. The computer system may thus generate the hash values for the database objects in this manner, in some embodiments.

To determine whether a first set of database objects has been accurately recreated for a corresponding second set of database objects, in various embodiments, hash values for both of the sets of database objects are generated using the data integrity procedure. The hash values for the first set of database objects may be compared with the hash values for the second set of database objects. In some embodiments in which the first and second sets of database objects are stored at different databases managed by different computer systems, one of the computer systems may send the hash values for its set of database objects to the other computer system to perform a comparison. If the corresponding hash values match, then the first set of database objects has been accurately recreated; otherwise, the first and second sets are different.

When implementing the data integrity procedure, in some embodiments, the computer systems spawns multiple threads to concurrently process work items in order to generate hash values for corresponding database objects. A work item may designate a database object (or a portion thereof) to be processed in order to generate a hash value. In some embodiments, as a part of obtaining the data cell hashes mentioned above, processes issue database commands to extract those data cell hashes from a database. In various embodiments, however, the database is designed such that a maximum number of concurrent database operations can be performed with respect to the database—the maximum number may be set by a user as opposed to a limit that is imposed by the physical capabilities of the system. In various embodiment, the number of processes spawned is based on the maximum number of concurrent database operations and another number that specifies how many concurrent database operations to utilize per database object. Consider an example in which a database supports 64 concurrent database operations and a user requests that 16 concurrent database operations be used per database table. As such, the computer system may spawn 4 processes, each of which can issue 16 concurrent database operations to process their assigned database table.

These techniques may be advantageous as they provide a mechanism for ensuring that data that has been accurately recreated under a replication approach such as a statement-based replication approach. These techniques are further advantageous as they disclose a concurrent approach for implementing that mechanism so that the determination on whether data has been accurately recreated can be performed within a shorter interval of time by processing database tables in parallel. These techniques are further advantageous as they allow for that mechanism to be resumed without restarting from the beginning in the case of a failure associated with the data integrity procedure. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes: a database 110 having database tables 120, and a database node 130. Also as shown, database tables 120 include data cells 125, and database node 130 includes work items 140, worker processes 150, and hash values 160. In some embodiments, system 100 may be implemented differently than shown—e.g., database 110 may include other database objects, such as indexes, that might be processed by database node 130 to generate hash values 160.

System 100, in various embodiments, implements a platform service (e.g., a customer relationship management (CRM) platform service) that allows users of that service to develop, run, and manage applications. System 100 may be a multi-tenant system that provides various functionality to multiple users/tenants hosted by the multi-tenant system. Accordingly, system 100 may execute software routines from various, different users (e.g., providers and tenants of system 100) as well as provide code, web pages, and other data to users, databases, and other entities associated with system 100. As shown for example, system 100 includes database node 130 that can store and access data from database tables 120 of database 110 on behalf of users associated with system 100.

Database 110, in various embodiments, is a collection of information that is organized in a manner that allows for access, storage, and manipulation of that information. Accordingly, database 110 may include supporting software that allows for database node 130 to carry out operations (e.g., accessing, storing, etc.) on information that is stored at database 110. In some embodiments, database 110 is implemented by a single or multiple storage devices connected together on a network (e.g., a storage attached network (SAN)) and configured to redundantly store information to prevent data loss. Database 110 may be shared between multiple database nodes 130 that can read data from database 110 and/or write data to database 110.

A database table 120, in various embodiments, is a collection of information, including data elements that are organized into a structured format having rows and columns. In various embodiments, the intersection between a row and a column of a database table 120 corresponds to a data cell 125 that is capable of storing a data value. Consider an example in which a column corresponds to an "age" attribute and rows correspond to users. Accordingly, the data cell 125 at the intersection between the column and a particular row may store an age value, such as 56, that is representative of the corresponding user's age. In various embodiments, a database table 120 may store data for multiple tenants (e.g., users, companies, etc.) of system 100. As a result, a subset of all rows of a database table 120 may correspond to one tenant while another subset of rows corresponds to another tenant. In various embodiments in which a database table 120 stores data for multiple tenants, that database table 120 includes a column defining tenant under which each row of database table 120 specifies a tenant corresponding to that row of data. An example database table 120 is discussed in greater detail with respect to FIG. 2A.

Database node 130, in various embodiments, is hardware, software, or a combination thereof capable of providing database services, such as data storage, data retrieval, and/or data manipulation. Such database services may be provided to other components within system 100 and/or to components external to system 100. As an example, database node 130 may receive a database transaction request from an application server (not shown) that is requesting data to be written to or read from database 110. Consequently, database node 130 may write database records to database 110 and read records from database 110. In various embodiments, database node 130 maintains database 110 as a primary or secondary/standby database.

In various embodiments, database 110 is a standby database that is a database replica of a primary database and thus is capable of serving as a backup database in the event that there is a failure with the primary database. Database 110 may be maintained as a standby database through a statement-based data replication approach in which database operations performed on a primary database are replayed on database 110. As such, database node 130 may receive database transaction requests having translation logs whose recorded database operations are replayed by database node 130 with respect to database 110. In various embodiments, database 110 is a primary database against which database node 130 performs new database writes. These new writes may be recorded in translation logs that database node 130 sends to other database nodes 130 so that those database nodes 130 can perform, on standby databases created based on database 110, the database writes that were performed with respect to database 110—this can be referred to as "replaying" the transaction log as a database node 130 performs, at the destination database 110, the transactions that were performed at the source database 110 corresponding to the transaction log. In various embodiments, a database 110 can become too large and can be split amongst multiple databases 110. Accordingly, data that is stored at the original database 110 can be reproduced at the other databases.

When data is reproduced at one database 110 based on another database 110, in various embodiments, a data integrity procedure can be performed to generate validation information, such as a set of hash values 160, that is usable to determine whether the data has been accurately reproduced—that is, that the particular data in both databases 110 match. As shown, database node 130 receives a data integrity request 135—this request may be received from a user (e.g., an administrator). Data integrity request 135, in various embodiments, is a request to generate the validation information and may identify the particular data to be validated and the degree of granularity at which to parse the work in processing the particular data. For example, data integrity request 135 may request that validation be performed for a single database table 120 or multiple database tables 120, such as all database tables 120 in database 110. Database node 130 may generate work items 140 based on data integrity request 135.

Work items 140, in various embodiments, are designations of work to be performed on a collection of data. For example, a work item 140 may include information that specifies a set of data cells 125 for which to generate a hash value 160. The amount of data cells 125 specified in a work item 140 may be based on the degree of granularity that is specified in data integrity request 135. For example, if data integrity request 135 indicates that one hash value 160 should be generated per database table 120, then database node 130 may create work items 140 such that each work item 140 indicates all data cells 125 of its corresponding database table 120. In various cases where a database table 120 stores data for multiple tenants, a work item 140 may specify all data cells 125 of its corresponding database table 120 that belong to the tenant that is associated with data integrity request 135. In some instances, data integrity request 135 may indicate other granularities than a hash-per-table granularity. Consider an example in which a database table 120 is split into multiple partitions. Data integrity request 135 may indicate that a hash value 160 should be generated for each partition and as a result, database node 130 may generate a work item 140 for each partition. In various embodiments, work items 140 are stored in one or more queues that are accessible to worker processes 150 for processing.

Worker processes 150, in various embodiments, are sets of threads that are executable to process work items 140 to generate hash values 160. A given worker process 150 may obtain a work item 140 from a queue, perform the work item 140, and then retrieve another work item 140 if that queue is not empty. To process a work item 140, in various embodiments, a worker process 150 obtains a set of hash values that corresponds to the set of data cells 125 associated with the work item 140. The worker process 150 may then perform a set of operations on that set of hash values to generate a hash value 160. An example process of generating a hash value 160 is discussed with respect to FIG. 2B. After hash values 160 have been generated, they may be compared with corresponding hash values 160 generated based on corresponding database tables 120 that may be stored in another database 110. If the hash values 160 match, then the particular data has been accurately reproduced; otherwise, there is at least one discrepancy.

Figures 2A, 2B:
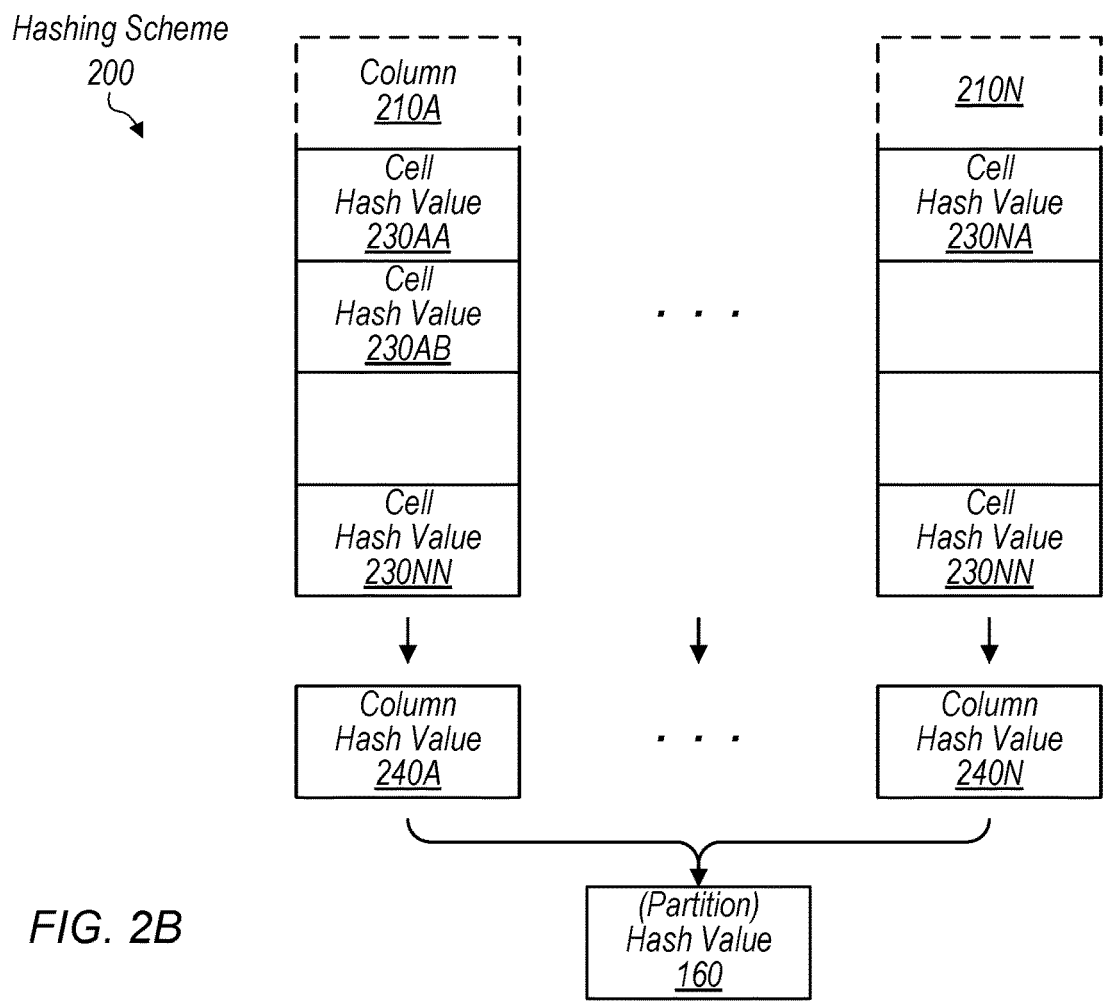
FIG. 2A is a block diagram illustrating example elements of a database table, according to some embodiments.
FIG. 2B is a block diagram illustrating example elements of a scheme for generating a set of hash values, according, according to some embodiments.

Turning now to FIG. 2A, a block diagram of an example database table 120 is shown. In the illustrated embodiment, database table 120 comprises columns 210A-N and rows whose intersections define data cells 125. Also as shown, data cells 125 collectively store data values 220AA-220NN. In various embodiments, database table 120 may be implemented differently than shown. For example, database table 120 may include additional information, such as hash values derived from data values 220 of data cells 125.

As mentioned, in various embodiments, database node 130 may store data at database 110 in the form of database tables 120 and/or other database objects, such as indexes. In some embodiments, database node 130 stores data for multiple tenants (e.g., companies, users, etc.) that are hosted by system 100. Accordingly, a row of data stored in database table 120 may be associated with a particular tenant. For example, column 210A might correspond to tenant IDs and thus data values 220AA-AN may each specify a tenant ID for the tenant that is associated with the corresponding row of that data value 220. As such, one or more rows of database table 120 may be associated with a first tenant while one or more other rows may be associated with a second tenant. When data is reproduced at another database 110, in some cases, only data of a particular tenant is reproduced. As a result, the data integrity procedure discussed herein may be performed with respect to data belonging to a particular tenant. Accordingly, the tenant ID associated with each row of data may be used to select those rows that belong to the particular tenant for validation.

Turning now to FIG. 2B, a block diagram of an example hashing scheme 200 that may be implemented by database node 130 is shown. Hashing scheme 200, in various embodiments, involves performing a set of summations to derive a hash value 160 from a set of corresponding cell hash values 230. A cell hash value 230, in various embodiments, is a value that is derived by hashing (e.g., performing a MurmurHash function) the data value 220 of the corresponding data cell 125. For example, data value 220AA may be hashed in order to derive cell hash value 230AA. In various embodiments, a given cell hash value 230 is calculated as part of database node 130 performing a database operation to update or add the corresponding data value 220 to database table 120. Database node 130 may then store that cell hash value 230 with database table 120. Consequently, when hashing scheme 200 is being implemented, database node 130 may extract stored cell hash values 230 associated with database table 120 by issuing database commands (e.g., SQL commands) for the cell hash values 230. In some embodiments, a given cell hash value 230 is calculated when implementing hashing scheme 200. Accordingly, when hashing scheme 200 is being implemented, database node 130 may extract data values 220 of database table 120 and then hash them to derive corresponding cell hash values 230.

In the illustrated embodiment, hashing scheme 200 is performed in order to generate a hash value 160 that is representative of database table 120. (In various cases, hashing scheme 200 may be performed using a subset of the data in database table 120 (e.g., data belonging to a particular tenant) to generate a hash value 160 that is representative of the subset of data.) As shown in the illustrated embodiment, cell hash values 230AA-NN corresponding to data values 220AA-NN are summed such that column hash values 240A-N are derived. In particular, the cell hash values 230 associated with a particular column 210 may be summed together to derive a column hash value 240 corresponding to that particular column 210. Also as shown, column hash values 240 are summed together to derive a hash value 160. Accordingly, in various cases, database node 130 may sum together cell hash values 230 of the data being validated to derive a hash value 160 that is representative of that data. That hash value 160 may be compared with a hash value 160 that is derived from the corresponding data that is supposed to match.

Figure 3:
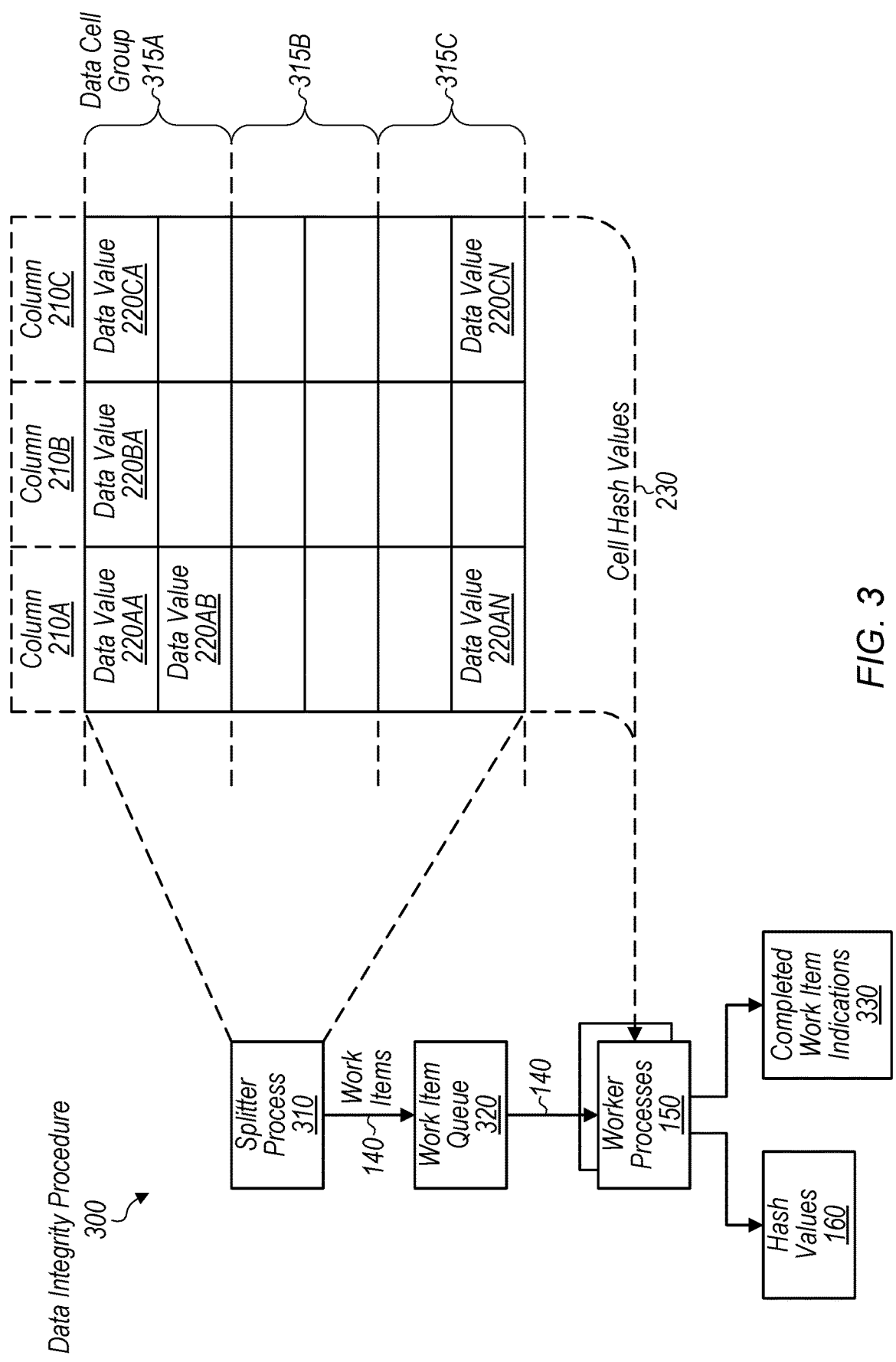
FIG. 3 is a block diagram illustrating example elements of a data integrity procedure, according to some embodiments.

Turning now to FIG. 3, a block diagram of a data integrity procedure 300 is shown. In the illustrated embodiment, data integrity procedure 300 includes a splitter process 310, a work item queue 320 that stores work items 140, and worker processes 150 that produce hash values 160 and completed work indications 330. In some embodiments, data integrity procedure 300 may be implemented differently than shown. As an example, worker processes 150 might not produce completed work item indications 330.

Splitter process 310, in various embodiments, is a set of threads executable to generate work items 140. As mentioned, database node 130 may receive a data integrity request 135. In response to receiving that data integrity request, database node 130 may spawn splitter process 310 to generate work items 140. In various embodiments, splitter process 310 generates work items 140 such that the work of generating hash values 160 for the particular data that is being validated is split in accordance with a specified granularity. As an example, a user may request that all of a particular tenant's data be assessed and that a hash value 160 be generated per table 120. Consequently, splitter process 310 may generate a work item 140 per database table 120 associated with the particular tenant. A work item 140 may identify a database table 120 (or a portion thereof) and the particular data of the database table 120 upon which to generate a hash value 160 (e.g., the work item 140 may specify a tenant identifier usable to select rows of that database table 120). As an example, data integrity request 135 may identify a partitioning such splitter process 310 creates a work item 140 that corresponds to data cell group 315A, a work item 140 that corresponds to data cell group 315B, and a work item 140 that corresponds to data cell group 315C. In some cases, a work item 140 may specify a database command (e.g., a SQL query) for pulling the data and/or cell hash values 230 for a database table 120. In various embodiments, splitter process 310 enqueues work items 140 in a work item queue 320 that is accessible to worker processes 150.

As work items 140 are added to work item queue 320, worker processes 150 may obtain them from work item queue 320 and process them to generate corresponding hash values 160 as discussed. In various embodiments, the number of worker processes 150 spawned to process work items 140 is based on a requested number of concurrent database operations to utilize in processing a given work item 140. As mentioned, in various cases, to process a work item 140, a worker process 150 may issue database commands to perform database operations to extract data or cell hash values 230 associated with a particular database table 120. As an example, a worker process 150 may issue SQL commands to obtain the cell hash values 230 associated with data cell group 315A. In some embodiments, however, database 110 is associated with a maximum number of concurrent database operations that is permitted to be performed with respect to database 110. For example, 64 concurrent database operations may be permitted to be performed with respect to database 110. Accordingly, the number of worker processes 150 that is spawned may be based a requested number of concurrent database operations to utilize in processing each work item 140 and the maximum number of concurrent database operations that is permitted to be performed with respect to database 110. Consider an example in which data integrity request 135 specifies that 16 concurrent database operations be utilized per work item 140 and database 110 is associated with a maximum of 64 concurrent database operations that can be running against database 110 at a given point in time. Accordingly, database node 130 may spawn four worker processes 150, each of which may retrieve a work item 140 and utilize 16 concurrent database operations, totaling 64 concurrent database operations.

After processing a work item 140 to generate a hash value 160, the worker process 150 may store the hash value 160 and retrieve another work item 140 from work item queue 320 if work item queue 320 is not empty. Worker process 150 may continually grab and process work items 140 until work item queue 320 is empty. In some embodiments, after processing a work item 140, the worker process 150 stores a completed work item indication 330 indicating that the work item 140 has been processed/completed. Accordingly, in the event that data integrity procedure 300 fails to complete (e.g., a system crash), database node 130 may use completed work items indications 330 to resume implementation of data integrity procedure 300 without having to restart from the beginning. As such, completed work item indications 330 may be stored at a location that is separate from database node 130 so that if database node 130 crashes those completed work item indications 330 are not lost.

Figure 4:
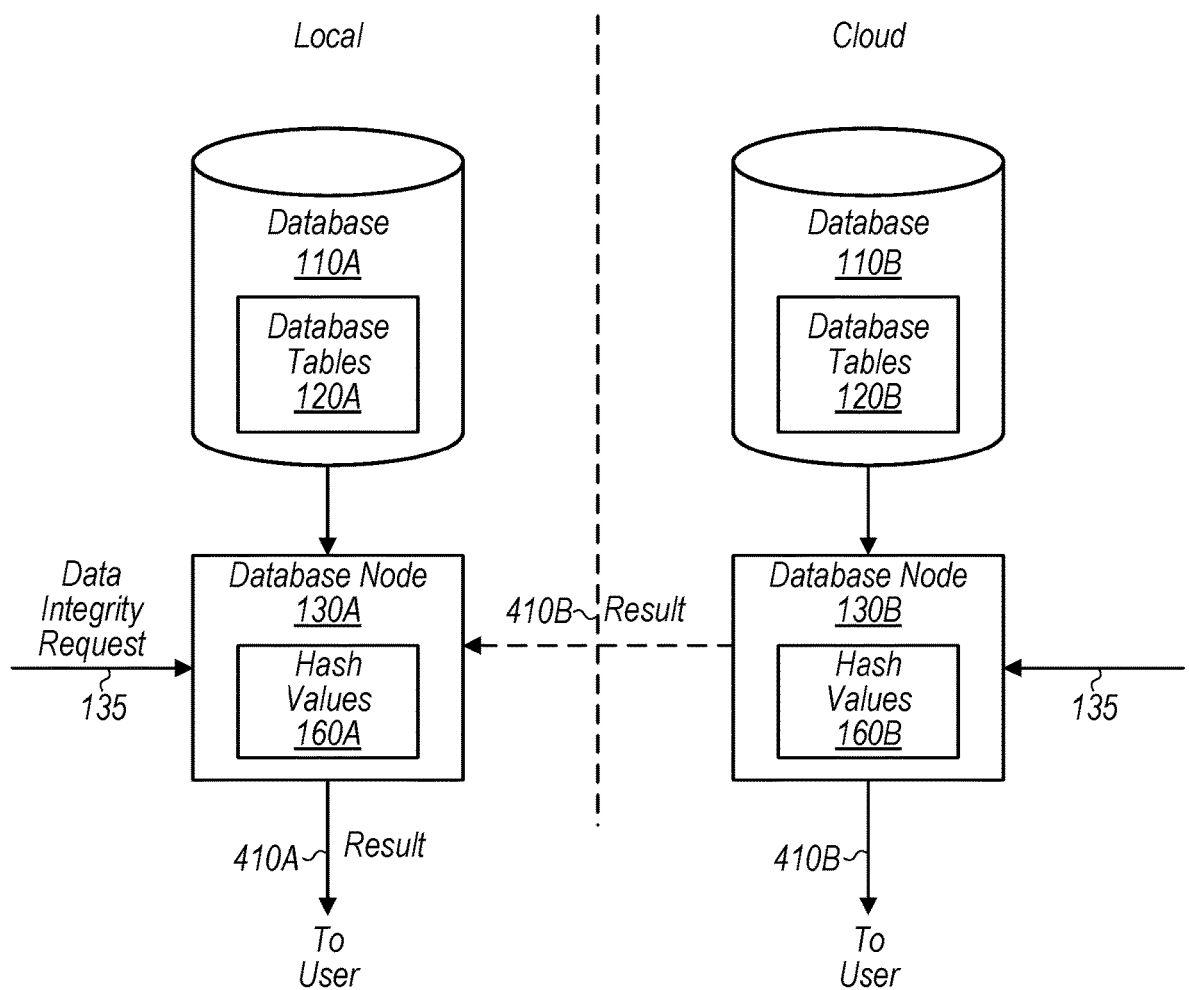
FIG. 4 is a block diagram illustrating example elements of a procedure for determining whether database tables match, according to some embodiments.

Turning now to FIG. 4, a block diagram of an example procedure to determine whether corresponding database tables 120 in separate databases 110 include the same information. In the illustrated embodiment, database 110A is located on a network local to database node 130A and stores database tables 120A while database 110B is located on a network that is remote to database node 130A and stores database tables 120B managed by database node 130B. In some cases, database 110A might be a database that is managed by a company using its own servers while database 110B stores data for the company, but is managed by a cloud provider, such as AWS® or Azure®. The illustrated embodiment may be implemented differently than shown. For example, database tables 120A and 120B might be stored in the same database 110 or in separate databases 110 that are on the same local network.

As shown, database nodes 130A and 130B each receive a data integrity request 135. In some cases, data integrity requests 135 may be received in response to an administrator logging into the corresponding database systems and submitting the requests 135 (e.g., via a command line tool). In some cases, the data integrity request 135 that is received by database node 130A may cause database node 130A to transmit the data integrity request 135 received by database node 130B (or vice versa). In yet some cases, database nodes 130 may implement data integrity procedure 300 (without receiving a data integrity request 135) in response to the occurrence of a particular event, such as a new version of the database.

In response to receiving the data integrity requests 135, database nodes 130A and 130B may then generate hash values 160A and 160B, respectively, based on corresponding database tables 120A and 120B. In various embodiments, the two data integrity requests 135 specify the same configuration parameters for implementing data integrity procedure 300. The parameters may specify, for example, the same partitioning of the data values 220 that are being validated (e.g., one work item 140 per table 120, one work item 140 per shard of a table 120, etc.), the same number of concurrent database operations to be utilized in processing a work item 140 (alternatively, the same number of processes 150 to spawn), and the version of the database to be used when performing data integrity procedure 300.

In various embodiments, during the operation of a given database 110, a database node 130 may store state information (e.g., database snapshots) that identifies the state of that given database 110 at different points in its lifecycle. For example, prior to performing a batch write to a database 110, database node 130 may store state information that allows for database node 130 to access, after performing the batch write, a prior version of the database 110 that existed before the batch write. As a result, in various embodiments, a database node 130 can view the data that was stored at a database 110 at a particular point in time. Due to the constant changing nature of the data of a database 110, data integrity request 135 may specify a particular version of database 110 to be used when performing data integrity procedure 300. Accordingly, in the illustrated embodiment, database nodes 130A and 130B may generate hash values 160 based on the same version/checkpoint—this version may not correspond to the current version since database 110A may be ahead of database 110B as initial writes to database 110A may be later replayed at database 110B.

After generating hash values 160A and 160B, in various embodiments, database nodes 130A and 130B provide them to a user as results 410A and 410B. The user may compare hash values 160A and 160B to determine whether they indicate that particular data of database tables 120A is the same as the corresponding data in database tables 120B. Instead of providing hash values 160 to a user, in some embodiments, database node 130B provides hash values 160B to database node 130A as result 410B (or vice versa). Accordingly, database node 130A may then compare hash values 160A and 160B to determine whether they match. Database node 130A may indicate, as part of result 410A, whether the particular data of database tables 120A is the same as the corresponding data in database tables 120B.

Figure 5:
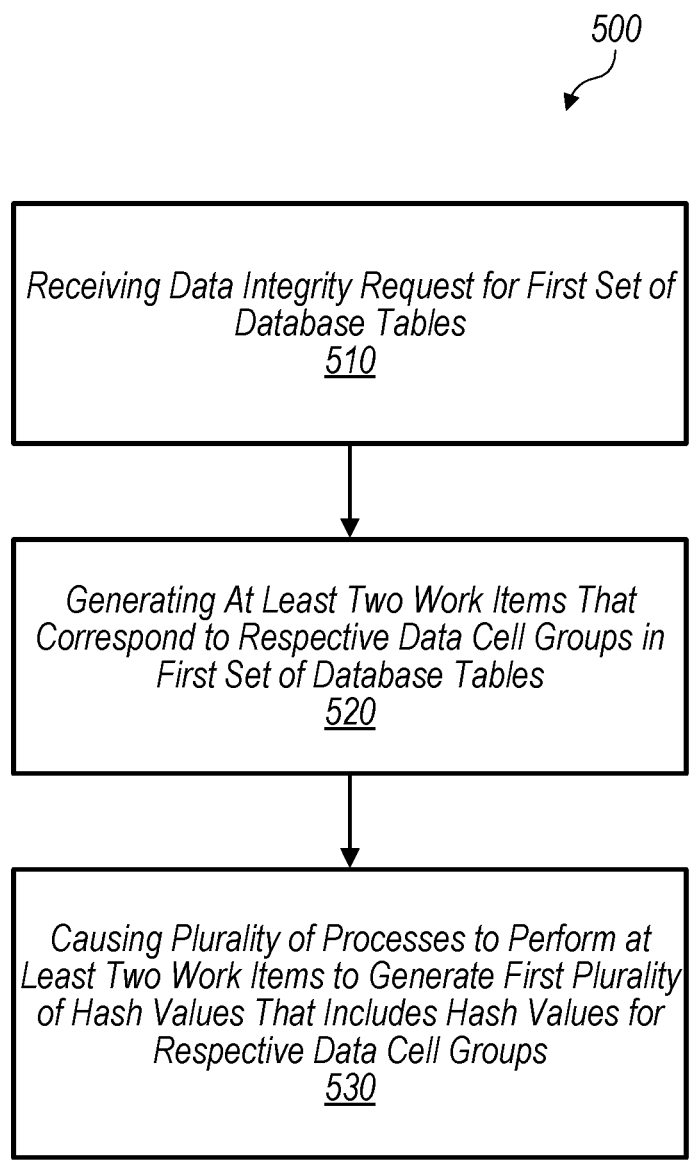
FIGS. 5 and 6 are flow diagrams illustrating example methods relating to performing a data integrity procedure that is usable to determine whether a set of database tables have been accurately reproduced for another set of database tables, according to some embodiments.

Turning now to FIG. 5, a flow diagram of a method 500 is shown. Method 500 is one embodiment of a method performed by a computer system (e.g., database node 130) to generate information (e.g., hash values 160) that is usable to determine whether different database tables (e.g., database tables 120) store the same data (e.g., data values 220). In various cases, method 500 may be performed by executing a set of program instructions stored on a non-transitory computer-readable medium. In some embodiments, method 500 may include additional steps than shown. For example, method 500 may include a step in which the computer system sends the generated information to another computer system.

Method 500 begins in step 510 with the computer system receiving a data integrity request (e.g., a data integrity request 135) for a first set of database tables. In some cases, the first set of database tables may be stored in a database (e.g., database 110) capable of accessing different versions of the first set of database tables. The different versions of the first set of database tables may be replicated based on a second set of database tables. In some cases, the first set of database tables may be stored in a database that is located on a network local to the computer system and the second set of database tables may be stored in a database located on a network remote to the computer system.

In step 520, the computer system generates at least two work items (e.g., work items 140) that correspond to respective data cell groups (e.g., data cell groups 315) in the first set of database tables. In some cases, the at least two work items may be generated such that each work item corresponds to a data cell group of a different respective database table of the first set of database tables—that is, one work item per database table. In some cases, the at least two work items may be generated such that a first work item corresponds to a first data cell group (e.g., data cell group 315A) of a first database table and a second work item corresponds to a second data cell group (e.g., data cell group 315B) of the same first database table. The computer system may store the at least two work items in a work item queue (e.g., work item queue 320) that is accessible to a plurality of processes (e.g., worker processes 150) that may retrieve and perform work items until the work item queue is empty.

In step 530, the computer system causes the plurality of processes to perform the at least two work items to generate a first plurality of hash values that includes hash values for the respective data cell groups. A particular one of the first plurality of hash values may be derived by summing hash values (e.g., cell hash values 230) mapped to data cells of a data cell group corresponding to the particular hash value. The particular process that performs the work item to generate the particular hash value may obtain the hash values mapped to the data cells by issuing a set of database queries for those hash values against the database that stores the first set of database tables.

The number of the plurality of processes spawned by the computer system may be based on a maximum number of concurrent database operations (e.g., 64 concurrent database operations) permitted by a database that stores the first set of database tables. In some cases, the computer system may receive, from a user via a user device, information that specifies a number of concurrent database operations to utilize for performance of a work item (e.g., 16 operations). The number of the plurality of processes spawned may be derived by dividing the maximum number of concurrent database operations by the number of concurrent database operations to utilize per work item (e.g., 64/16=4, thus four processes may be spawned).

The first plurality of hash values may be usable to compare with corresponding ones of a second plurality of hash values generated based on corresponding data cell groups in the second set of database tables replicated from the first set of database tables. The first and second pluralities of hash values may be generated based on the same non-current version of the first and second sets of database tables.

In some cases, the computer system may receive, from another computer system that manages a database that stores the second set of database tables, the second plurality of hash values generated based on the corresponding data cell groups in the second set of database tables. The computer system may perform a comparison between the first and second sets of hash values and, based on the comparison, return a response (e.g., a result 410) to the data integrity request that indicates whether the data cell groups in the first set of database tables store the same information as the corresponding data cell groups in the second set of database tables. In yet some cases, the computer system may return, to an entity (e.g., an administrator) associated with the data integrity request, a response that includes the first plurality of hash values to enable the entity to perform a comparison between the first and second sets of hash values to determine whether the data cell groups in the first set of database tables store the same information as the corresponding data cell groups in the second set of database tables.

Figure 6:
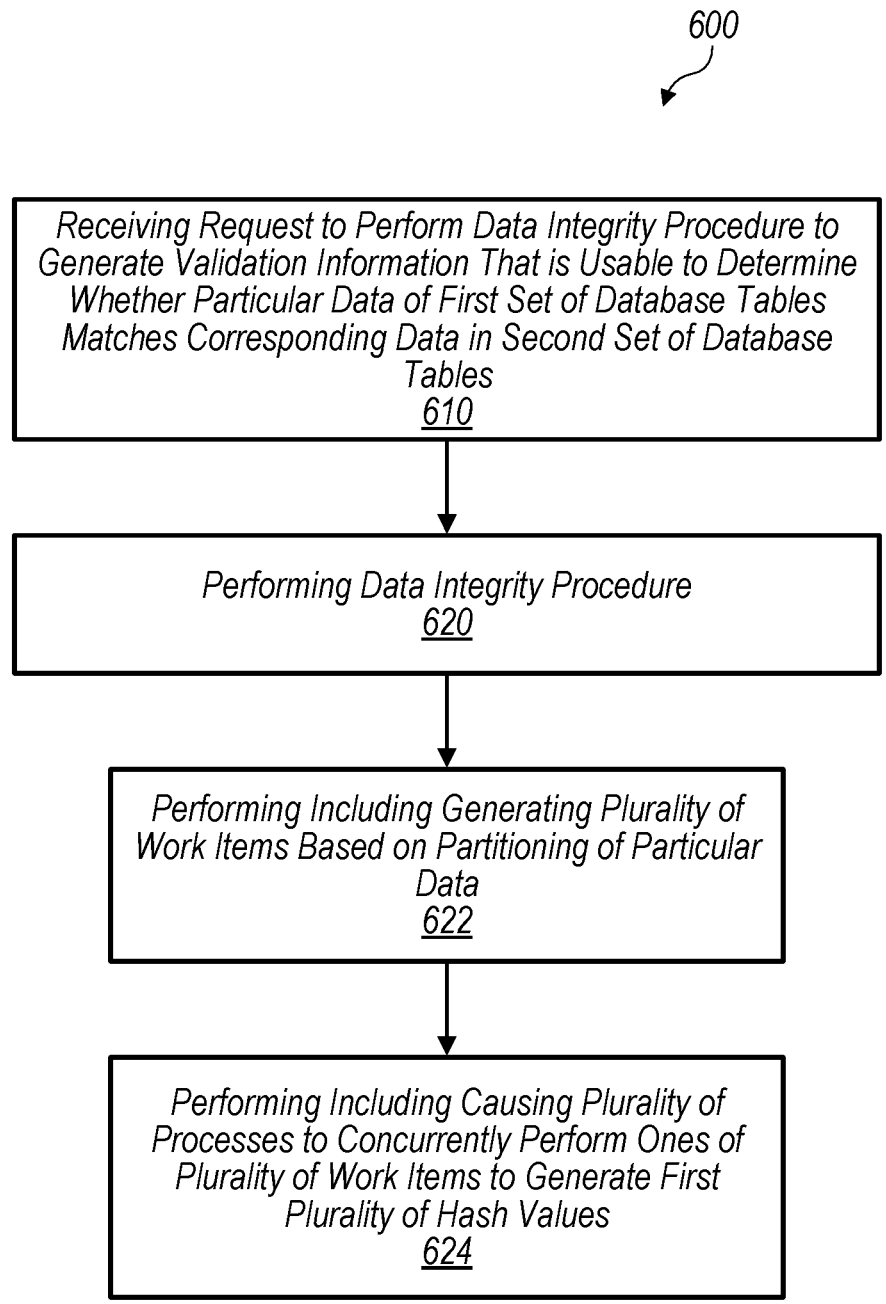

Turning now to FIG. 6, a flow diagram of a method 600 is shown. Method 600 is one embodiment of a method performed by a computer system (e.g., database node 130) to generate information (e.g., hash values 160) that is usable to determine whether different database tables (e.g., database tables 120) store the same data (e.g., data values 220). In various cases, method 600 may be performed by executing a set of program instructions stored on a non-transitory computer-readable medium. In some embodiments, method 600 may include additional steps than shown. For example, method 600 may include a step in which the computer system sends the generated information to another computer system.

Method 600 begins in step 610 with the computer system receiving a request (e.g., a data integrity request 135) to perform a data integrity procedure (e.g., data integrity procedure 300) to generate validation information that is usable to determine whether particular data of a first set of database tables matches corresponding data in a second set of database tables. The data integrity procedure may be performed with respect to a non-current version of the first set of database tables that is specified by the request. In some cases, the particular data corresponds to a particular tenant of a plurality of tenants of the computer system that have data stored in the first set of database tables.

In step 620, the computer system performs the data integrity procedure. As part of performing the data integrity procedure, in step 622, the computer system generates a plurality of work items (e.g., work items 140) based on a partitioning of the particular data (e.g., partitioned into data cell groups 315). A particular work item may correspond to a set of data cells included in the first set of database tables. As part of performing the data integrity procedure, in step 624, the computer system causes a plurality of processes (e.g., worker processes 150) to concurrently perform ones of the plurality of work items to generate a first plurality of hash values. A particular hash value may be derived from a set of hash values (e.g., cell hash values 230) that correspond to the set of data cells associated with the particular work item. The validation information may include the first plurality of hash values that are comparable with a second plurality of hash values generated based on the second set of database tables to determine whether the particular data matches the corresponding data in the second set of database tables. In some instances, the computer system sends the validation information to another computer system that is capable of performing a comparison between the first and second pluralities of hash values to determine whether the particular data matches the corresponding data in the second set of database tables.

In some embodiments, the plurality of processes store a set of indications of completed work items (e.g., completed work item indications 330). In response to the data integrity procedure failing to be completed, the computer system may initiate the data integrity procedure such that only those ones of the plurality of work items that are not indicated by the set of indications of completed work items are performed, and wherein the plurality of work items correspond to sets of data cells associated with the particular tenant and not other ones of the plurality of tenants.

Exemplary Computer System

Figure 7:
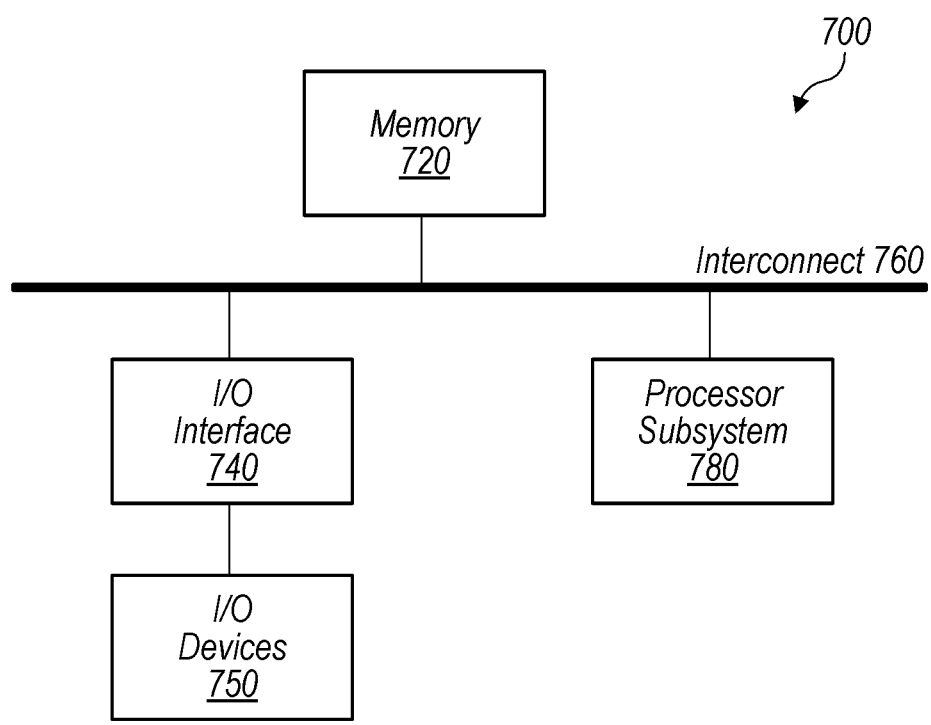
FIG. 7 is a block diagram illustrating an example computer system, according to some embodiments.

Turning now to FIG. 7, a block diagram of an exemplary computer system 700, which may implement system 100, database 110, or database node 130, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement database 110, database node 130, worker processes 150, data integrity procedure 300, splitter process 310 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
 receiving, by a computer system, a data integrity request for a first set of database tables;
 generating, by the computer system, a plurality of work items that correspond to respective data cell groups in the first set of database tables;
 causing, by the computer system, a plurality of processes to perform a data integrity procedure that involves performing the plurality of work items to generate a first plurality of hash values that includes hash values for the respective data cell groups, wherein at least two of the plurality of work items correspond to different database tables and are performed at least partially in parallel, and wherein the plurality of processes are operable to store indications of work items that have been completed;
 in response to the data integrity procedure failing to be completed, the computer system reinitiating the data integrity procedure such that only those ones of the plurality of work items that are not indicated by the indications of completed work items are performed; and
 wherein, to perform the data integrity request, the first plurality of hash values are usable to compare with corresponding ones of a second plurality of hash values generated based on corresponding data cell groups in a second set of database tables replicated from the first set of database tables.

2. The method of claim 1, wherein the at least two work items are generated such that a first work item corresponds to a first data cell group of a first database table and a second work item corresponds to a second data cell group of the same first database table.

3. The method of claim 1, wherein a particular one of the first plurality of hash values is derived by summing hash values that are mapped to data cells of a data cell group.

4. The method of claim 3, wherein a particular process of the plurality of processes that performs a work item to generate the particular hash value is operable to obtain the hash values mapped to the data cells by issuing a set of database queries for those hash values against a database that stores the first set of database tables.

5. The method of claim 1, wherein a number of the plurality of processes spawned by the computer system is based on a maximum number of concurrent database operations permitted by a database that stores the first set of database tables.

6. The method of claim 5, further comprising:
 receiving, by the computer system from a user via a user device, information specifying a number of concurrent database operations to utilize per database table, wherein the number of the plurality of processes spawned is derived by dividing the maximum number of concurrent database operations by the number of concurrent database operations to utilize per database table.

7. The method of claim 1, wherein the first set of database tables are stored in a database capable of accessing different versions of the first set of database tables, and wherein the first plurality of hash values are generated based on a non-current version of the first set of database tables.

8. The method of claim 1, further comprising:
storing, by the computer system, the at least two work items in a work item queue that is accessible to the plurality of processes, wherein a particular process is operable to retrieve and perform work items until the work item queue is empty.

9. The method of claim 1, wherein the first set of database tables is stored in a database on a network local to the computer system and the second set of database tables is stored in a database on a network remote to the computer system.

10. A non-transitory computer readable medium having program instructions stored thereon that are capable of causing a computer system to perform operations comprising:
receiving a data integrity request for a first set of database tables;
generating a plurality of work items that correspond to respective data cell groups in the first set of database tables;
causing a plurality of processes to perform a data integrity procedure that involves performing the plurality of work items to generate a first plurality of hash values that includes hash values for the respective data cell groups, wherein at least two of the plurality of work items correspond to different database tables and are performed at least partially in parallel, and wherein the plurality of processes are operable to store indications of work items that have been completed; and
in response to the data integrity procedure failing to be completed, reinitiating the data integrity procedure such that only those ones of the plurality of work items that are not indicated by the indications of completed work items are performed;
wherein the first plurality of hash values are usable to compare with corresponding ones of a second plurality of hash values generated based on corresponding data cell groups in a second set of database tables replicated from the first set of database tables.

11. The non-transitory computer readable medium of claim 10, wherein a given hash value of the first plurality of hash values is generated, for a respective data cell group, using a plurality of hash values generated based on data values stored in a corresponding plurality of data cells of the respective data cell group.

12. The non-transitory computer readable medium of claim 10, wherein the first set of database tables are stored in a database associated with a maximum number of concurrent database operations that are permitted to be performed against the database, and wherein the operations further comprise:
receiving information that specifies a number of concurrent database operations to use for a given work item when processing that given work item; and
spawning the plurality of processes to have a number of processes such that a number of concurrent work items being processed uses the maximum number of concurrent database operations in accordance with the number of concurrent database operations specified by the received information.

13. The non-transitory computer readable medium of claim 10, wherein the operations further comprise:
receiving, from another computer system that manages a database that stores the second set of database tables, the second plurality of hash values generated based on the corresponding data cell groups in the second set of database tables;
performing a comparison between the first and second pluralities of hash values; and
based on the comparison, returning a response to the data integrity request that indicates whether the data cell groups in the first set of database tables store the same information as the corresponding data cell groups in the second set of database tables.

14. The non-transitory computer readable medium of claim 10, wherein the operations further comprise:
returning, to an entity associated with the data integrity request, a response that includes the first plurality of hash values to enable the entity to perform a comparison between the first and second pluralities of hash values to determine whether the data cell groups in the first set of database tables store the same information as the corresponding data cell groups in the second set of database tables.

15. A method, comprising:
receiving, by a computer system, a request to perform a data integrity procedure to generate validation information that is usable to determine whether particular data of a first set of database tables matches corresponding data in a second set of database tables; and
performing, by the computer system, the data integrity procedure, including:
generating a plurality of work items based on a partitioning of the particular data, wherein a particular work item corresponds to a set of data cells included in the first set of database tables, and wherein at least two of the plurality of work items correspond to different database tables and are performed at least partially in parallel; and
causing a plurality of processes to concurrently perform ones of the plurality of work items to generate a first plurality of hash values, wherein a particular hash value is derived from a set of hash values that correspond to the set of data cells associated with the particular work item, and wherein the validation information includes the first plurality of hash values that are comparable with a second plurality of hash values generated based on the second set of database tables to determine whether the particular data matches the corresponding data in the second set of database tables, wherein the plurality of processes are operable to store indications of work items that have been completed that enable the compute system to reinitiate the data integrity procedure in response to a failure of the data integrity procedure such that only those ones of the plurality of work items that are not indicated by the indications of completed work items are performed.

16. The method of claim 15, wherein the data integrity procedure is performed with respect to a non-current version of the first set of database tables that is specified by the request.

17. The method of claim 15, wherein the particular data corresponds to a particular tenant of a plurality of tenants of the computer system that have data stored in the first set of database tables, and wherein the plurality of work items correspond to sets of data cells associated with the particular tenant and not other ones of the plurality of tenants.

18. The method of claim 15, further comprising:
sending, by the computer system, the validation information to another computer system that is capable of performing a comparison between the first and second pluralities of hash values to determine whether the particular data matches the corresponding data in the second set of database tables.

* * * * *